United States Patent [19]

Tsutsumi et al.

[11] Patent Number: 4,742,117

[45] Date of Patent: May 3, 1988

[54] CONJUGATED DIENE BASED RUBBER COMPOSITION

[75] Inventors: Fumio Tsutsumi; Mitsuhiko Sakakibara; Noboru Shimada; Yoshihisa Fujinaga, all of Yokkaichi; Noboru Oshima, Suzuka; Tatsuro Hamada, Higashimurayama; Tatsuo Fujimaki, Higashimurayama, all of Japan

[73] Assignees: Japan Synthetic Rubber Co., Ltd.; Bridgestone Corporation, both of Tokyo, Japan

[21] Appl. No.: 39,833

[22] Filed: Apr. 17, 1987

Related U.S. Application Data

[63] Continuation of Ser. No. 804,952, Dec. 5, 1985, abandoned.

[30] Foreign Application Priority Data

Dec. 13, 1984 [JP] Japan .................................. 59-263285
Jan. 25, 1985 [JP] Japan .................................. 60-13355

[51] Int. Cl.$^4$ .............................................. C08L 9/00
[52] U.S. Cl. ..................................... 525/98; 525/123; 525/131
[58] Field of Search .......................... 525/98, 123, 131

[56] References Cited

U.S. PATENT DOCUMENTS 4,020,125 4/1977 Suzuki et al. ...................... 525/131
4,080,357 3/1978 Gergen et al. ..................... 515/132

FOREIGN PATENT DOCUMENTS

| 985614 | 3/1965 | United Kingdom . |
| 1262948 | 2/1972 | United Kingdom . |
| 1268527 | 3/1972 | United Kingdom . |
| 1276320 | 6/1972 | United Kingdom . |
| 1414174 | 11/1975 | United Kingdom . |
| 1423302 | 2/1976 | United Kingdom . |
| 1487823 | 10/1977 | United Kingdom . |
| 1502800 | 3/1978 | United Kingdom . |
| 1527226 | 10/1978 | United Kingdom . |

*Primary Examiner*—Joseph L. Schofer
*Assistant Examiner*—Bernard Lipman
*Attorney, Agent, or Firm*—Sughrue, Mion, Zinn, Macpeak & Seas

[57] ABSTRACT

A rubber composition containing not less than 20% of a conjugated diene based polymer or copolymer. The polymer or copolymer is obtained by polymerizing a conjugated diene or copolymerizing the conjugated diene with at least one kind of other conjugated diene and an aromatic vinyl compound with use of a lithium initiator, and then reacting an isocyanate compound with active terminals of the thus obtained polymer or copolymer. The conjugated diene is butadiene or isoprene, while other conjugated diene is selected from pentadiene, 2,3-dimethylbutadiene as well as isoprene and butadiene, and an aromatic vinyl compound may be styrene, vinyltoluene, α-methylstyrene, etc. The rubber composition is applicable as tread portion, carcass, side wall portion of tires, vibration resistant rubber, window frame, hose, and various industrial articles.

13 Claims, 2 Drawing Sheets

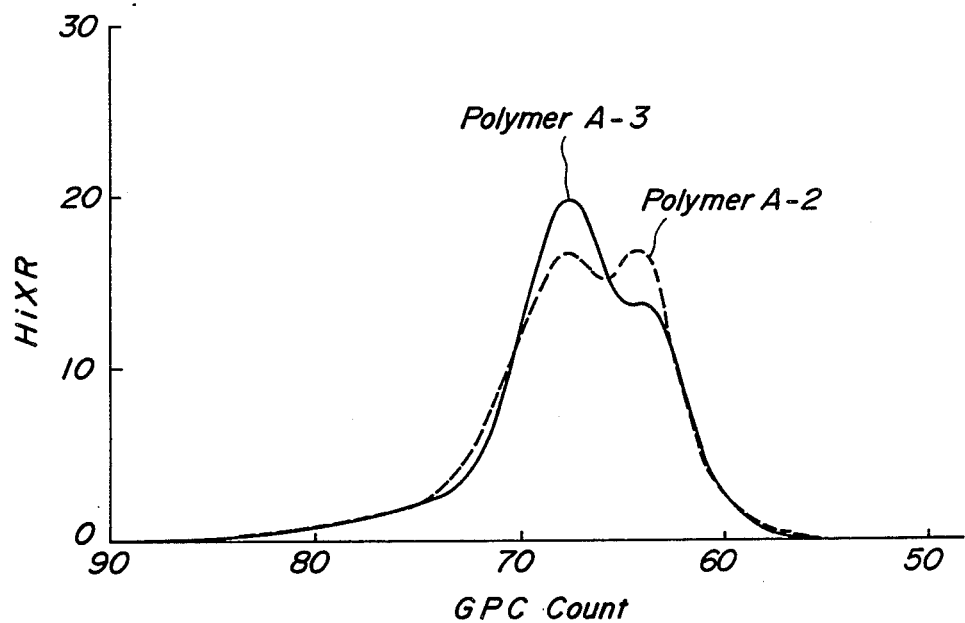
FIG_1
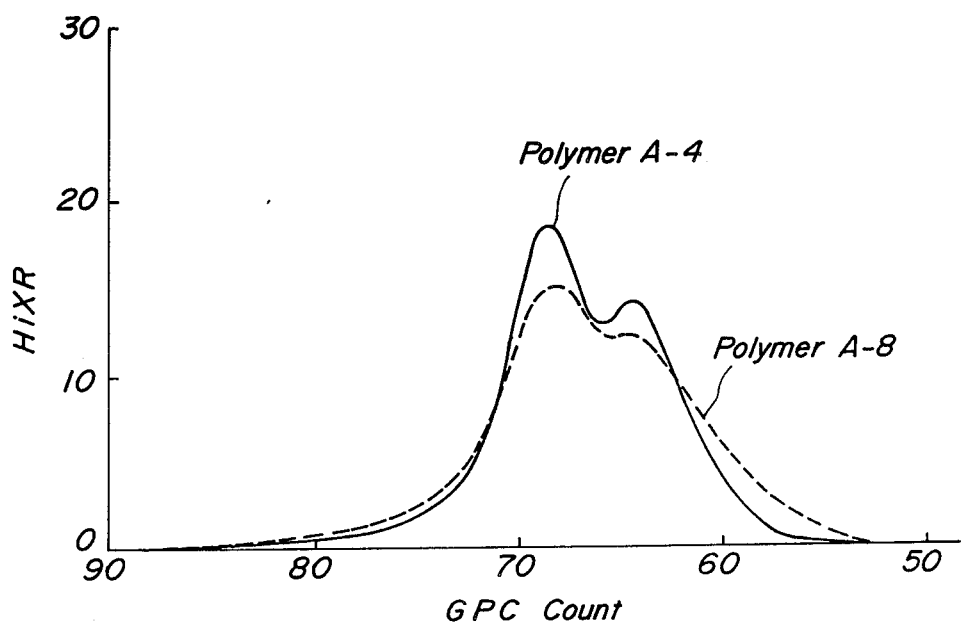
FIG_2

CONJUGATED DIENE BASED RUBBER COMPOSITION

This is a continuation of application Ser. No. 804,952 filed 12/5/85, now abandoned.

BACKGROUND OF THE INVENTION

1. Field of the Invention

The present invention relates to a conjugated diene base rubber composition giving rise to an improved vulcanizate.

2. Related Art Statement

With the recent requirements for the safety and low fuel consumption in the automobiles, there have been demanded excellent conjugated diene based polymers meeting both the above requirements as a rubber material for the tires, particularly a rubber material for the tire treads and so on.

Conventionally, as described in Japanese Patent Publication No. 4,996/69, U.S. Pat. No. 3,956,232, Japanese Patent Application Laid-open No. 205,414/82 and so on, these conjugated diene based polymers have been obtained by polymerizing conjugated diene compound or copolymerizing a conjugated diene compound and a vinyl aromatic compound in a hydrocarbon solvent with use of an organic lithium initiator, and then reacting the resulting product with a halogenated tin compound or an alkenyl tin compound.

However, since the above polymer has carbon-tin bonds in terminals thereof, the carbon-tin bonds are readily cut through a chemical reaction with an acidic substance such as an inorganic acid, an organic carboxylic acid and a Lewis acid, an organic phosphrous compound, and further an organic sulfur compound, or through hydrolysis reaction under a strong acid or a strong alkali to damage the physical properties, and thus additives usable for the rubber composition are restricted.

In order to solve these problems possessed by the prior art techniques, the present inventors have proposed that the branched conjugated diene base polymer excellent in processability, tensile strength, and impact resilience can be obtained by the introducing tertiary amino groups into terminals of the conjugated diene based polymer and further combining a coupling agent such as a tin compound therewith (Japanese Patent Application Laid-open No. 38,209/84), the amino compound used in this technique is insufficient in effects of improving the rolling friction resistance and the wet skid performance of the valcanizate thereof.

Further, natural rubber and a synthetic polyisoprene rubber may be recited as a rubber material excellent in the breaking strength. They are now widely used mainly in the tire treads of the trucks and buses which serve under high load conditions. As compared with the lithium type butadiene polymer (or copolymer) as mentioned above, the natural rubber and the synthetic polyisoprene rubber are inferior in the impact resilience and therefore have been strongly desired to be improved.

SUMMARY OF THE INVENTION

The present invention has been attained through discovery that a rubber composition containing a diene based polymer (or copolymer) which is obtained by polymerizing (or copolymerizing) a conjugated diene monomer with use of a lithium initiator and then reacting the thus obtain polymer (or copolymer) with a specific isocyanate compound is excellent in the above characteristics. The conjugated diene used here means a butadiene or isoprene.

According to the present invention, there is a provision of a rubber composition containing not less than 20% of a conjugated diene based polymer (or copolymer) which is obtained by polymerizing a conjugated diene or copolymerizing the conjugated diene with at least one kind of other conjugated diene and an aromatic vinyl compound with use of a lithium initiator, and then reacting an isocyanate compound with active terminals of thus obtained polymer or copolymer.

According to another aspect of the present invention, there is a provision of a rubber composition containing at least 30% of a butadiene based polymer (or copolymer) which is obtained by polymerizing butadiene or copolymerizing butadiene with at least one kind of other conjugated diene and an aromatic vinyl compound with use of a lithium initiator, and then reacting terminals of the polymer thus obtained with an isocyanate compound.

According to another aspect of the present invention, there is a provision of a rubber composition containing at least 20% of a isoprene based polymer (or copolymer) which is obtained by polymerizing isoprene or copolymerizing isoprene with at least one kind of other conjugated diene and an aromatic vinyl compound with use of a lithium initiator, and then reacting terminals of the polymer thus obtained with an isocyanate compound.

That is, in the case that the conjugated diene in the present invention is butadiene, the rubber composition is excellent in fuel consumption characteristics, wet skid resistance, and water resistance. In case that the conjugated diene is isoprene, the rubber composition according to the present invention is excellent in impact resilience and breaking strength. Thus, the rubber composition suitable particularly for the tire treads can be obtained in both cases.

These and other objects, features and advantages of the invention will be well appreciated upon reading of the following description of the invention when taken in connection with the drawings with understanding that some modifications, variations and changes of the same could be easily done by the skilled in the art to which the invention pertains without departing from the spirit of the invention or the scope of claims appended thereto.

BRIEF DESCRIPTION OF THE DRAWINGS

The invention will be explained below with reference to the attached drawings, wherein:

FIGS. 1 and 2 are patterns of the molecular weight distribution of polymers A-2, A-4, A-8, and A-3 as measured according to the gel permeation chromatograph.

DETAILED DESCRIPTION OF THE INVENTION

Figure 3:
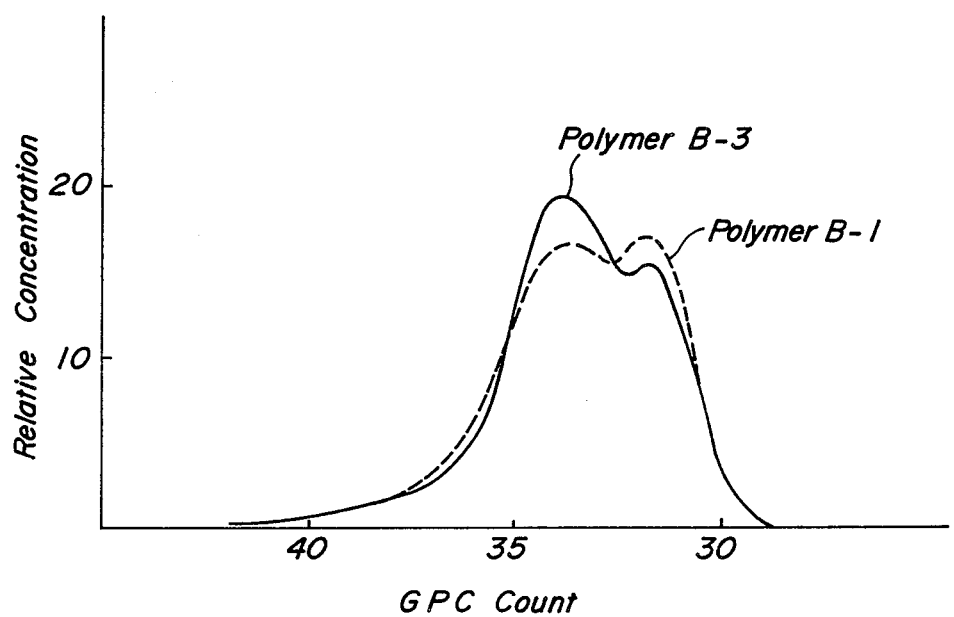
FIG. 3 is a pattern of the molecular weight distribution of polymers B-1 and B-3.

It is preferable that while the content of the vinyl bonds in the butadiene portion is not less than 15% in the case of the butadiene based polymer (or copolymer), the molecular weight is 10–150 expressed by Mooney viscosity ($ML_{1+4}^{100°\ C.}$) in the case of isoprene based polymer (or copolymer).

The content of vinyl bonds in the butadiene portion of the butadiene based polymer (or copolymer) according to the present invention is not less than 15%, preferably not less than 20%, and more preferably not less than 30%. It is preferably not less than 90% from the standpoint of manufacture and effects.

If it is less than 15%, it becomes difficult to simultaneously improve the wet skid resistance and the rolling friction resistance. That is, if the wet skid resistance is intended to be improved, the rolling friction resistance becomes damaged, while if the rolling friction resistance is intended to be improved, the wet skid resistance is deteriorated.

The glass transition temperature (Tg) of the butadiene based polymer (or copolymer) according to the present invention is preferably not less than $-70°$ C., more preferably not less than $-60°$ C. From the standpoint of the effects, it is preferably not less than $-30°$ C. If the glass transition temperature is less than the above lower limit, the wet skid resistance is unfavorably deteriorated. The glass transition temperature (Tg) is a value measured by DSC. For a reference purpose, the glass transition temperature of Li type Br containing 12% of the vinyl bond content is $-108°$ C., while Ni and an emulsion polymerization polymer SBR #1500 are $-76°$ C. and $-64°$ C., respectively.

The butadiene based polymer (or copolymer) used in the present invention can be obtained by solution polymerizing butadiene along or butadiene with at least one kind of other conjugated diene and an aromatic vinyl compound in a hydrocarbon solvent with use of a lithium initiator, and then reacting the resulting polymer with an isocyanate compound.

As other conjugated diene, use may be made of isoprene, pentadiene and so on, while styrene vinyltoluene and α-methylstyrene may be used as the aromatic vinyl compound.

In particular, the styrene-butadiene copolymer containing at least not less than 5% by weight of styrene is preferable because of its excellent wet skid resistance and rolling friction resistance, high tensile strength and excellent processability.

The above content of styrene is not specifically restrictive, but it is preferably not more than 50% by weight, more preferably not more than 45% by weight.

The isoprene based polymer (or copolymer) used in the present invention may be obtained by polymerizing isoprene along or copolymerizing isoprene with at least one kind selected from other conjugated diene and an aromatic vinyl compound in a hydrocarbon solvent with use of a lithium initiator, and then reacting the resulting polymer with an isocyanate compound added in a specific amount. If the content of isoprene in the copolymer is less than 30% by weight, the beaking strength is deteriorated.

Further, as the hydrocarbon solvent, mention may be made of pentane, hexane, heptane, octane, methylcyclopentane, cyclohexane, benzene, xylene and so on.

As the employed lithium initiator, use may be made of alkyl lithium such as n-buthylithium, sec-buthyl lithium, or 1,4-dilithiobutane and organic lithium amide such as N-methylbenzylithium amide, and dioctyl lithium amide.

The lithium initiator may be used in an amount of 0.1–100 mg equivalent as lithium atom per 100 g of the monomer.

In particular, the polymer (or copolymer) excellent in the tensile strength can be obtained by copolymerizing the conjugated diene monomer in combination with a polyfunctional monomer such as 1,4-dithiobutane or alkyl monolithium and divinyl benzene and reacting terminals of the resulting polyfunctional polymer with the isocyanate compound.

As the isocyanate compound, mention may be made of 2,4-tolylene diisocyanate, 2,6-tolyene diisocyanate, diphenyl methane diisocyanate, naphthalene diisocyanate, tolydine diisocyanate, triphenylmethane triisocyanate, p-phenylene diisocyanate, tris(isocyanate phenyl)thiophosphate xylene diisocyanate, benzene-1,2,4-triisocyanate, naphthalene-1,2,5,7-tetraisocyanate, naphthalene-1,3,7-triisocyanate, phenyl isocyanate, hexamethylene diisocyanate, methylcyclohexane diisocyanate, and so on. Preferably, aromatic diisocyanate compounds, aromatic triisocyanate or dimer or trimer of various aromatic isocyanate compounds and adducts in which the above aromatic isocyanates are reacted with a polyol or a polyamine. Aromatic polyisocyanate compound such as 2,4-tolylene diisocyanate, diphenyl methane diisocyanate, naphthalene diisocyanate are more preferred. The aromatic isocyanate compound is used in an amount of from 0.1 equivalent to 10 equivalents and preferably from 0.2 to 3 equivalents as an isocyanate group per one mole of lithium atom. If the aromatic isocyanate compound is fallen outside this range, effects of improving the rolling friction resistance and tensile strength can not be obtained.

The polymerization (or copolymerization) reaction using the lithium initiator as well as the reaction between active terminals and the isocyanate after the polymerization (or copolymerization) are carried out in a range of 0° C. to 150° C., and may be done under isothermic condition or temperature rising condition. The polymerization system may be either a batch polymerization system or a continuous polymerization system.

With respect to the microstructure of the butadiene portion of the butadiene based polymer (or copolymer), the content of the vinyl bonds may be freely varied by the addition of an ether such as tetrahydrofuran, diethylether, dimethoxybenzene, dimethoxyethane, ethylene glycol dibuthyl ether, triethylamine, pyridine, N,N,N',N'-tetramethylethylenediamine, and dipyperidino ethane and a tertiary amino compound to the polymerization system.

The content of butadiene in the butadiene based polymer (or copolymer) is preferably not less than 30% by weight from the standpoint of the tensile strength. The above-mentioned butadiene based polymer (or copolymer) needs to be included in an amount of not less than 30% by weight, more preferably not less than 40% by weight in the rubber composition according to the present invention. If it is less than 30% by weight, the intended rubber composition excellent in the wet skid resistance, the rolling friction resistance and the tensile strength can not be obtained.

With respect to the microstructure of the conjugated diene portion of the isoprene based polymer (or copolymer), the content of vinyl bonds (the total content of 1,2-bond and 3,4-bond being totally referred to "vinyl content") can be freely varied by the addition of an ether such as tetrahydrofuran, diethyl ether, dimethoxybenzene, dimethoxyethane, ethylene glycole dibutyl ether, triehylamine, pyridine, N,N,N',N'-tetramethylethylenediamine, and dipyperidinoethane and a tertiary amino compound to the polymerization system.

Although the content of the vinyl bonds is not specifically restricted, the glass transition temperature becomes higher with the increase in the vinyl content to lower the low temperature characteristics. The content of the vinyl bonds is therefore preferably not more than 30%.

The Mooney viscosity ($ML_{1+4}^{100°\,C.}$) of the isoprene based polymer (or copolymer) according to the present invention is in a range of from 10 to 150. If the viscosity is less than 10, the impact resilience and the breaking strength are lowered, while if it is over 150, the processability is deteriorated.

The Mooney viscosity ($ML_{1+4}^{100°\,C.}$) of the butadiene based polymer (or copolymer) according to the present invention is preferably in a range of 10 to 150. If it is less than 10, the tensile strength and the rolling friction resistance are unfavorably deteriorated, while if it is over 150, the processability is undesirably damaged.

The isoprene based polymer (or copolymer) needs to be contained in the rubber composition according to the present invention in an amount of not less than 20% by weight on the basis of 100 parts by weight of a raw rubber. If it is less than 20% by weight, the intended rubber composition high in impact resilience and excellent in tensile strength can not be obtained. It is preferably not less than 30% by weight although the upper limit of the weight percentage of the polymer (or copolymer) in the rubber composition according to the present invention is not particularly set, it is preferably not more than 90% by weight. If it exceeds 90% by weight, unpreferably the processability of the rubber composition is deteriorated and the strength at high temperature is lowered.

The conjugated diene based polymer (or copolymer) according to the present invention may include a polymer in which vinyl bonds are bonded to the side chains thereof, polymer having a uniform composition along the chains of the aromatic vinyl derivative molecules, or continuously varying polymer or a block-like polymer.

The rubber composition according to the present invention is mainly composed of the above-mentioned conjugated diene polymer (or copolymer) as an indispensable component, and is obtained by blending this conjugated diene polymer (or copolymer) with at least one or more kinds of rubbers selected from natural rubber, high cis-polyisoprene, emulsion polymerized styrene-butadiene copolymer, other solution polymerized styrene-butadiene copolymer having 10–40% by weight of bond styrene and 10–80% by weight of vinyl content, high cis-polybutadiene obtained by using a catalyst from nickel, cobalt, titanium or neodinyum, ethylene-propyrene-diene terpolymer, halogenated butyl rubber, and halogenated ethylene-propyrene-diene terpolymer, and compounding an oily extender such as an aromatic process oil, and a naphtenic process oil, other various compounding agent and a vulzanizer when necessary.

The butadiene base polymer (or copolymer) used in the rubber composition according to the present invention has the isocyanate-denatured groups at the polymer terminals which are formed through the reaction between lithium atoms of the polymer terminals with isocyanate groups, so that the rubber composition having excellent tensile strength, wet skid resistance and rolling friction resistance of the vulcanizate thereof can be obtained.

The isoprene polymer (or copolymer) used in the rubber composition according to the present invention has isocyanate-denatured groups at the terminals of the polymer which are formed through the reaction between the lithium atoms at the polymer terminals with the isocyanate compound so that the rubber composition having excellent breaking strength and impact resilience of a vulcanizate thereof.

In the following, the present invention will be explaned more in detail with referring to the following examples, which are merely given to be illustrative of the invention, but the invention is never intepreted to be limited to these examples so long as the gist of the invention is maintained.

In the Examples, various measurements have been made in the following manners.

The microstructure of the butadiene portion (the content of the vinyl bonds) were determined by an infrared method (Morelo method).

The content of the styrene was determined according to the infrared method based on the absorption of the phenyl group at 699 cm$^{-1}$ with reference to the preliminarily obtained calibration curve.

The molecular weight distribution (Mw/Mn) was measured by a 200 type GPC manufactured by Waters Co., Ltd. Columns of STYRAGEL-$10^6$, $10^6$, $10^5$, $10^4$ (4 feet×4) were used. Tetrahydrofuran was used as a solvent.

The Mooney viscosity was measured under the conditions of a preheating for 1 minute, a measuring time period of 4 minutes, and temperature of 100° C.

The tensile strength was measured according to JIS K 6301.

The wet skid resistance was measured at room temperature (250° C.) by using a Stanley kid tester, and was shown by index taking Comparative Examples 1–4 as 100. The larger the value, the better the wet skid resistance.

The rolling friction resistance was measured taking the impact resilience as a substitution characteristic. The measurement was done at 50° C. so that results might be indexes for the rolling friction resistance of the tire. Dunlop Tripsometer was used as a measuring device.

EXAMPLES 1-1 TO 1-17 AND COMPARATIVE EXAMPLES 1-1 TO 1-8:

(Polymers A-1 to A-15)

After cyclohexane, a monomer or monomers and tetrahydrofuran were charged into a 5 liter-inner volume container replaced with nitrogen according to a recipe shown in Table 1, a lithium initiator was added thereto and polymerization reaction was adiabatically carried out at a temperature of 30° to 90° C.

After the polymerization conversion degree reached 100%, an isocyanate compound was added only in an amount shown in Table 1, and reacted. Di-tert-butyl-p-cresol was added as anti-oxidant in an amount of 0.7 g relative to 100 g of rubber, and desolvation and drying were carried out according to ordinarily manners.

FIGS. 1 and 2 show patterns of molecular weight distribution of samples (Polymers A-2, A-4, A-8, and A-3) measured by a gel permeation chromatograph. As obvious from these figures, the samples have a bi-modal molecular weight distribution, and the isocyanate compound is bonded to polymer terminals by adding the isocyanate compound after the polymerization of the butadiene based monomer by using the lithium initiator.

Results obtained by measuring the characteristics of the resulting polymes are shown in Table 2.

(Polymers A-16 to A-17)

Butadiene based copolymers were obtained similarly in the case of Polymer A-1 at the recipe in Table 1 except that silicon tetrachloride or diethyl diadipate was used instead of the isocyanate compound.

Results obtained through the measurement of the characteristics of the copolymers were shown in Table 2.

(Polymers A-18 to A-20)

Butadiene based polymers (or copolymers) were obtained according to the recipe of Table 1 similarly in the case of Polymer A1 except that no isocyanate compound was used.

The characteristics of the polymer (or copolymer) measured are shown in Table 2.

(Polymer A-21)

Into a 10 liter-inner volume reactor equipped with a stirrer and a heating jacket were continuously charged 12 g/min of butadiene and 3 g/min of styrene as monomer, 75 g/min of cyclohexane and 1 g/min of tetrahydrofuran as a solvent, and 0.07 g of n-buthylithium as solvent based on 100 g of the monomer by means of a pump, and the temperature of the reactor was controlled to 70° C. The polymerization conversion degree at an outlet of the reactor was not less than 95%. At an inlet of a second reactor (10 l), diphenylmethane isocyanate was added in an amount of one equivalent per one mole of lithium atom, and subjected to reaction. At an outlet of the second reactor, an anti-oxidant (di-tert-butyl-p-cresol) was added in an amount of 0.73 g based on 100 g of rubber, and then desolvation and drying were carried out in ordinary manners. Measured results of various characteristics of the thus obtained polymer (Polymer A-21) were shown in Table 3.

Each of Polymers A-1 to A-21 obtained in the above was kneaded by using of a 250 cc plastomill according to a compounding recipe of Table 4, and then vulcanized at 145° C. for 30 minutes. Evaluation results of physical properties are shown in Table 5.

The rubber compositions obtained in Examples 1-1 to 1-17 are rubber compositions which are excellent in tensile strength, wet skid resistance and impact resilience in the vulcanizate, and therefore they are rubber materials suitable for the tread portion and side wall portion of the tires and as various industrial materials.

TABLE 1

| Polymer | Monomer cyclohexane (g) | butadiene (g) | isoprene (g) | styrene (g) | tetrahydrofuran (g) | n-butylithium (g) | dilithiobutane (g) | isocyanate compound (equivalent of isocyanate group per lithium atom) |
|---|---|---|---|---|---|---|---|---|
| A-1 | 2,000 | 500 | — | — | 3 | 0.31 | — | diphenylmethane diisocyanate (2.0) |
| A-2 | " | " | — | — | 25 | 0.33 | — | diphenylmethane diisocyanate (2.0) |
| A-3 | " | 400 | — | 100 | " | 0.32 | — | diphenylmethane diisocyanate (2.0) |
| A-4 | " | " | — | " | 10 | " | — | diphenylmethane diisocyanate (2.0) |
| A-5 | " | " | — | " | " | " | — | 2,4-tolylene diisocyanate (2.0) |
| A-6 | " | " | — | " | " | " | — | naphthalene diisocyanate (2.0) |
| A-7 | " | " | — | " | " | " | — | triphenylmethane triisocyanate (1.2) |
| A-8 | " | " | — | " | " | — | 0.41 | diphenylmethane diisocyanate (1.5) |
| A-9 | " | " | — | " | " | — | " | tolylene diisocyanate (1.5) |
| A-10 | " | " | — | " | " | 0.36*[1] | — | diphenylmethane diisocyanate (2.0) |
| A-11 | " | " | — | " | " | 0.32 | — | 2,4-tolylene diisocyanate (0.5) |
| A-12 | " | " | — | " | " | " | — | 2,4-tolylene diisocyanate (0.5) |
| A-13 | " | " | — | " | " | 0.26 | — | phenyl isocyanate (2.0) |
| A-14 | " | " | — | " | " | 0.32 | — | hexymethylene diisocyanate (2.0) |
| A-15 | " | 500 | — | — | 0 | 0.33 | — | diphenylmethane diisocyanate (2.0) |
| A-16 | " | 400 | — | 100 | 10 | 0.30 | — | silicon tetrachloride (1.0)*[2] |
| A-17 | " | " | — | " | " | 0.32 | — | diethyl adipate (1.0)*[3] |
| A-18 | " | 500 | — | — | 0 | 0.26 | — | no |
| A-19 | " | " | — | — | 25 | 0.25 | — | no |
| A-20 | " | 400 | — | 100 | 10 | 0.26 | — | no |

*[1] Divinylbenzene was added in an amount of 0.15 g with respect to 100 g of monomer in polymerization reaction.
*[2] equivalent of chlorine
*[3] equivalent of ester

TABLE 2

| Polymer | Microstructure styrene content (wt %) | vinyl content (wt %) | Mooney viscosity ($ML_{1+4}^{100°C.}$) | Tg (°C.) |
|---|---|---|---|---|
| A-1 | 0 | 42 | 55 | −88 |
| A-2 | 0 | 72 | 54 | −51 |
| A-3 | 20 | 61 | 52 | −44 |
| A-4 | " | 48 | 56 | −58 |
| A-5 | " | " | 58 | " |
| A-6 | " | " | 61 | " |
| A-7 | " | " | 62 | " |
| A-8 | " | " | 65 | " |
| A-9 | " | " | 65 | " |
| A-10 | " | " | 60 | " |
| A-11 | " | " | 57 | " |
| A-12 | " | " | 58 | " |
| A-13 | " | " | 47 | " |
| A-14 | " | " | 59 | " |
| A-15 | 0 | 12 | 48 | −108 |
| A-16 | 20 | 48 | 65 | −58 |
| A-17 | 20 | 48 | 52 | −58 |
| A-18 | 0 | 12 | 45 | −108 |
| A-19 | 0 | 72 | 51 | −51 |
| A-20 | 20 | 48 | 52 | −58 |
| A-21 | 20 | 53 | 59 | −50 |

TABLE 3

| | Microstructure Styrene (wt %) | Vinyl content (wt %) | Mooney viscosity ($ML_{1+4}^{100°C.}$) | Tg (°C.) |
|---|---|---|---|---|
| Polymer A-21 | 20 | 53 | 59 | −50 |

TABLE 4

| Compounding recipe | |
|---|---|
| | part by weight |
| Polymer | 100 |
| HAF carbon | 50 |
| Stearic acid | 2 |
| Zinc oxide | 3 |
| Anti-oxidant 810NA*[1] | 1 |
| Vulcanization accelerator CZ*[2] | 0.6 |
| Vulcanization accelerator M*[3] | 0.6 |
| Vulcanization accelerator D*[4] | 0.4 |
| Sulfur | 1.5 |

*[1]N—phenyl-N—isoprepyl-p-phenylenediamine
*[2]N—cyclohexyl-2-benzothiazolyl sulfenamide
*[3]2-mercaptobenzothiazol
*[4]1,3-diphenyl guanidine

TABLE 5

| | Polymer (part) | NR (part) | E-SBR*[1] (part) | BR*[2] (part) | Elongation (%) | Tensile strength (kgf/cm$^2$) | Impact resilience (%) at 50° C. | Wet skid resistance | Processability*[3] |
|---|---|---|---|---|---|---|---|---|---|
| Example | | | | | | | | | |
| 1-1 | A-2 (70) | 30 | — | — | 420 | 240 | 71 | 110 | 8 |
| 1-2 | A-3 (70) | " | — | — | 400 | 274 | 71 | 115 | 9 |
| 1-3 | A-4 (70) | " | — | — | 410 | 275 | 70 | 107 | 10 |
| 1-4 | A-5 (70) | " | — | — | 410 | 270 | 70 | 105 | 9 |
| 1-5 | A-6 (70) | " | — | — | 420 | 268 | 71 | 108 | 9 |
| 1-6 | A-7 (70) | " | — | — | 430 | 272 | 70 | 108 | 9 |
| 1-7 | A-8 (70) | " | — | — | 410 | 285 | 71 | 107 | 10 |
| 1-8 | A-9 (70) | " | — | — | 420 | 286 | 71 | 108 | 9 |
| 1-9 | A-10 (70) | " | — | — | 410 | 287 | 71 | 108 | 9 |
| 1-10 | A-3 (50) | 50 | — | — | 420 | 288 | 72 | 105 | 10 |
| 1-11 | A-3 (100) | — | — | — | 400 | 265 | 72 | 120 | 9 |
| 1-12 | A-21 (100) | — | — | — | 420 | 273 | 70 | 110 | 10 |
| 1-13 | A-4 (100) | 15 | — | 15 | 400 | 265 | 71 | 106 | 9 |
| 1-14 | A-11 (70) | 30 | — | — | 410 | 256 | 69 | 108 | 8 |
| 1-15 | A-12 (70) | " | — | — | 420 | 260 | 69 | 109 | 9 |
| 1-16 | A-13 (70) | " | — | — | 410 | 250 | 69 | 108 | 9 |
| 1-17 | A-14 (70) | " | — | — | 400 | 251 | 69 | 107 | 9 |
| Comparative Example | | | | | | | | | |
| 1-1 | A-18 (70) | 30 | — | — | 400 | 220 | 70 | 85 | 6 |
| 1-2 | A-19 (70) | " | — | — | 390 | 215 | 67 | 108 | 7 |
| 1-3 | A-20 (70) | " | — | — | 410 | 240 | 67 | 105 | 8 |
| 1-4 | — | " | 70 | — | 420 | 285 | 66 | 100 | 9 |
| 1-5 | A-1 (70) | " | — | — | 410 | 235 | 72 | 90 | 6 |
| 1-6 | A-15 (70) | " | — | — | 380 | 217 | 71 | 85 | 7 |
| 1-7 | A-16 (70) | " | — | — | 390 | 249 | 67 | 105 | 9 |
| 1-8 | A-17 (70) | " | — | — | 380 | 248 | 67 | 106 | 9 |

*[1]SBR #1500 manufactured by Japan Synthetic Rubber Co., Ltd. used.
*[2]JSR BR01 manufactured by Japan Synthetic Rubber Co., Ltd. used.
*[3]Processability is evaluated in the following ways.
roll retention (10 inch roll used)
extrusion processability (extruded profile, speed)
processability evaluation = roll retention + extrusion processability
With respect to evaluation on each of the roll retention, the extrusion processability and the processability, the larger the evaluation figure, the more excellent is the characteristics.

The rubber composition according to the present invention is suitably applicable to tires such as tread portion, carcass portion, and side wall portion of the tire, and belt, vibration resistant rubber, window frame, hose, industrial articles.

(Polymers B-1 to B-15)

Into a 5 liter-inner volume reactor replaced with nitrogen were charged cyclohexane, monomer and tetrahydrofuran according to a recipe shown in Table 6, and the polymerization reaction was carried out at an elevated temperature of 40°–90° C. after the addition of a lithium initiator.

After the polymerization conversion degree reached 100%, an isocyanate compound was added only by an amount shown in Table 6. Di-tert-butyl-p-cresol was added as an anti-oxidant in an amount of 0.7 g with respect to 100 g of rubber, and then desolvation and drying were carried out according to ordinary manners. Measurement results of the molecular characteristics were shown in Table 7.

(Polymer B-16)

Into A 5 litter-inner volume reactor replaced with nitrogen were charged 2,000 g of cyclohexane and 350 g of isoprene, and then n-butyl lithium was added to initiate the polymerization. Polymerization was carried out at a temperature range of 50°–70° C. After the polymerization conversion degree reached 100%, 150 g of butadiene was further added to continue the polymerization. After the completion of the polymerization, diphenyl methane diisocyanate was added in an amount of two equivalents with respect to one lithium atom.

The molecular weight distributions of Polymers B-1 and B-3 were measured according to the gel permeation chromatograph (GPC), and results thereof are shown in FIG. 3.

(Polymers B-17 and B-18)

Polymers were obtained according to the method in Polymer B-1 except that the isocyanate compound was replaced by silicon tetrachloride and glycerol tristearate, respectively.

FIG. 3 shows that Polymers B-1 and B-3 have a bimodal molecular weight distribution and that the isocyanate compound is bonded to the terminals of the polymer by the addition of the isocyanate compound after the polymerization of the monomer with the lithium initiator.

A composition according to the recipe shown in Table 8 was kneaded by using a 250 cc plastomill, and vulcanized at 145° C. for 20 minutes.

Evaluation results of the physical properties were shown in Table 9.

TABLE 6

| Polymer No. | cyclo-hexane (g) | Monomer isoprene (g) | buta-diene (g) | sytrene (g) | tetra-hydrofuran (g) | n-butyllithium (g) | dilithio-butane (g) | isocyanate compound (equivalent of isocyanate group per lithium atom) |
|---|---|---|---|---|---|---|---|---|
| B-1 | 2,000 | 500 | — | — | — | 0.26 | — | diphenylmethane diisocyanate (1.5) |
| B-2 | " | " | — | — | — | " | — | tolylene diisocyanate (1.0) |
| B-3 | " | " | — | — | — | " | — | tolylene diisocyanate (2.0) |
| B-4 | " | " | — | — | — | — | 0.5 | tolylene diisocyanate (2.0) |
| B-5 | " | " | — | — | 3 | 0.25 | — | tolylene diisocyanate (2.0) |
| B-6 | " | 400 | 100 | — | — | 0.26 | — | tolylene diisocyanate (2.0) |
| B-7 | " | " | — | 100 | — | 0.25 | — | tolylene diisocyanate (2.0) |
| B-8 | " | 500 | — | — | 10 | 0.26 | — | tolylene diisocyanate (1.8) |
| B-9 | " | " | — | — | — | 0.21 | — | no |
| B-10 | " | 400 | 100 | — | — | " | — | no |
| B-11 | " | " | — | 100 | — | " | — | no |
| B-12 | " | 500 | — | — | — | 0.32 | — | tolylene diisocyanate (1.5) |
| B-13 | " | " | — | — | — | 0.25 | — | tolylene diisocyanate (0.8) |
| B-14 | " | " | — | — | — | " | — | tolylene diisocyanate (0.5) |
| B-15 | " | " | — | — | — | 0.26 | — | hexamethylene diisocyanate (2.0) |
| B-17 | " | " | — | — | — | 0.25 | — | silicon tetrachloride (1.0) |
| B-18 | " | " | — | — | — | 0.26 | — | glycelol tristealate (0.5) |

TABLE 7

| Polymer No. | Vinyl bond content in isoprene portion (%) (butadiene portion) | Mooney viscosity ($ML_{1+4}^{100°C.}$) |
|---|---|---|
| B-1 | 7 | 52 |
| B-2 | 7 | 55 |
| B-3 | 7 | 46 |
| B-4 | 7 | 47 |
| B-5 | 20 | 54 |
| B-6 | 7 (14) | 55 |
| B-7 | 7 | 53 |
| B-8 | 41 | 52 |
| B-9 | 7 | 43 |
| B-10 | 7 (14) | 45 |
| B-11 | 7 | 42 |
| B-12 | 7 | less than 10 |
| B-13 | 7 | 47 |
| B-14 | 7 | 44 |
| B-15 | 7 | 55 |
| B-16 | 7 (14) | 51 |
| B-17 | 7 | 58 |
| B-18 | 7 | 49 |

TABLE 8

| Compounding recipe | part by weight |
|---|---|
| Polymer | 100 |
| HAF carbon | 50 |
| Stearic acid | 2 |
| Zinc oxide | 3 |
| Anti-oxidant 810NA*[1] | 1 |
| Vulcanization accelerator NOBS*[2] | 1 |
| Sulfur | 1.5 |

*[1] N—phenyl-N—isoprepyl-p-phenylenediamine
*[2] N—oxydiethylene-2-benzothiazylsulpheneamide

TABLE 9

| | Polymer Polymer No. (part) | NR (part) | BR*[1] (part) | SBR*[2] (part) | Tensile strength Room temperature (kgf/cm²) | 100° C. (kgf/cm²) | Impact resilience (%) 50° C. | 80° C. |
|---|---|---|---|---|---|---|---|---|
| Example | | | | | | | | |
| 2-1 | B-1 (50) | 50 | — | — | 275 | 217 | 71 | 75 |
| 2-2 | B-2 (50) | 50 | — | — | 277 | 220 | 71 | 74 |
| 2-3 | B-3 (50) | 50 | — | — | 279 | 219 | 72 | 74 |
| 2-4 | B-3 (70) | 30 | — | — | 264 | 201 | 72 | 76 |
| 2-5 | B-3 (50) | 50 | — | — | 270 | 216 | 70 | 74 |
| 2-6 | B-4 (30) | 70 | — | — | 282 | 230 | 70 | 73 |
| 2-7 | B-5 (50) | 50 | — | — | 269 | 210 | 69 | 72 |
| 2-8 | B-6 (50) | " | — | — | 272 | 215 | 71 | 74 |
| 2-9 | B-7 (50) | " | — | — | 266 | 221 | 70 | 74 |
| 2-10 | B-8 (50) | " | — | — | 262 | 201 | 68 | 72 |
| 2-11 | B-3 (30) | " | — | 20 | 278 | 207 | 69 | 73 |
| 2-12 | B-3 (30) | " | 20 | — | 267 | 206 | 69 | 74 |
| 2-13 | B-13 (50) | " | — | — | 273 | 215 | 71 | 75 |
| 2-14 | B-14 (50) | " | — | — | 263 | 205 | 70 | 72 |
| 2-15 | B-15 (50) | " | — | — | 268 | 207 | 70 | 72 |
| 2-16 | B-16 (50) | " | — | — | 260 | 203 | 70 | 72 |
| 2-17 | B-3 (85) | 15 | — | — | 250 | 198 | 73 | 76 |
| 2-18 | B-3 (100) | 0 | — | — | 240 | 192 | 72 | 76 |
| Comparative Example | | | | | | | | |
| 2-1 | B-3 (10) | 90 | — | — | 283 | 235 | 67 | 71 |

TABLE 9-continued

| | Polymer | | | | Tensile strength | | Impact resilience (%) | |
|---|---|---|---|---|---|---|---|---|
| | Polymer No. | NR | BR*[1] | SBR*[2] | Room temperature | 100° C. | | |
| | (part) | (part) | (part) | (part) | (kgf/cm²) | (kgf/cm²) | 50° C. | 80° C. |
| 2-2 | B-9 (50) | 50 | — | — | 250 | 195 | 67 | 71 |
| 2-3 | B-10 (50) | " | — | — | 252 | 191 | 68 | 71 |
| 2-4 | B-11 (50) | " | — | — | 248 | 192 | 66 | 70 |
| 2-5 | — | 100 | — | — | 292 | 237 | 66 | 70 |
| 2-6 | — | 50 | 50 | — | 245 | 185 | 67 | 71 |
| 2-7* | B-9 (50) | " | — | — | 252 | 195 | 69 | 72 |
| 2-8 | B-12 (50) | " | — | — | 240 | 199 | 67 | 69 |
| 2-9 | B-17 (50) | " | — | — | 253 | 190 | 67 | 69 |
| 2-10 | B-18 (50) | " | — | — | 248 | 185 | 67 | 69 |

*0.5 part of diphenylmethane diisocyanate was added in kneading.
*[1]JSR BR01 manufactured by Japan Synthetic Rubber Co., Ltd.
*[2]SBR #1500 manufactured by Japan Synthetic Rubber Co., Ltd.

The isoprene base rubber composition according to the present invention is a rubber composition excellent in the tensile strength at room temperature and high temperatures, and also excellent in the impact resilience, and is suitably applicable to tires such as the carcass, side wall and so on, belt, vibration resistant rubber, window frame, hose and various industrial articles.

What is claimed is:

1. A rubber composition containing not less than 30% of a butadiene-based polymer or copolymer which is obtained by the steps of (A) polymerizing butadiene or copolymerizing butadiene with at least one other conjugated diene monomer and an aromatic vinyl compound using a lithium initiator, and (B) reacting an aromatic isocyanate compound with the active terminals of the thus obtained butadiene-based polymer or copolymer, wherein the content of vinyl bonds in the butadiene portion is not less than 15% and the glass transition temperature of the butadiene-based polymer or copolymer is not less than −70° C.

2. The rubber composition according to claim 1, wherein the isocyanate compound is an aromatic polyisocyanate compound.

3. The rubber composition according to claim 1, wherein the butadiene based polymer or copolymer is a random styrene-butadiene copolymer containing not less than 5% by weight of styrene.

4. The rubber composition according to claim 1, wherein the content of vinyl bonds in the butadiene portion is not less than 2%.

5. The rubber composition according to claim 4, wherein the content of vinyl bonds in the butadiene portion is not less than 30% and not more than 90%.

6. The rubber composition according to claim 1, wherein the glass transition temperature of the polymer or copolymer is not less than −60° C.

7. The rubber composition according to claim 1, wherein the aromatic isocyanate compound is selected from the group essentially consisting of 2,4-tolylene diisocyanate, 2,6-tolylene diisocyanate, diphenyl methane diisocyanate, naphthalene diisocyanate, tolydine diisocyanate, triphenylmethane triisocyanate, p-phenylene diisocyanate, tris(isocyanate phenyl)thiophosphate, xylene diisocyanate, benzene-1,2,4-triisocyanate, naphthalene-1,2,5,7-tetraisocyanate, naphthalene-1,3,7-triisocyanate, phenyl isocyanate, hexamethylene diisocyanate and methylcyclohexane diisocyanate.

8. The rubber composition according to claim 1, wherein the lithium initiator is used in an amount of from 0.1 to 100 mg equivalents per 100 g of the monomer.

9. The rubber composition according to claim 1, wherein the aromatic isocyanate compound is used in an amount of from 0.1 to 10 equivalents per one mole of lithium atom.

10. The rubber composition according to claim 1, wherein the aromatic isocyanate compound is used in an amount of from 0.2 to 3 equivalents per one mole of lithium atom.

11. The rubber composition according to claim 1, wherein the content of butadiene in the butadiene based polymer or copolymer is not less than 30% by weight.

12. The rubber composition according to claim 11, wherein the content of butadiene in the butadiene based polymer or copolymer is not less than 40% by weight.

13. The rubber composition according to claim 1, wherein the molecular weight of the butadiene based polymer or copolymer is from 10 to 150 as expressed by the Mooney viscosity ($ML_{1+4}^{100°\ C.}$).

* * * * *